United States Patent [19]

Lipski et al.

[11] Patent Number: 5,167,825
[45] Date of Patent: Dec. 1, 1992

[54] SUPPORTED PERVAPORATION MEMBRANE AND MODULE CONTAINING ARRAYS OF MEMBRANES

[75] Inventors: Christopher J. Lipski, Burlington; Pierre L. Cote, Hamilton, both of Canada

[73] Assignee: Her Majesty the Queen as represented by Minister of the Environment c/o Environment Canada, Ottawa, Canada

[21] Appl. No.: 767,153

[22] Filed: Sep. 30, 1991

[51] Int. Cl.⁵ .............................................. B01D 61/36
[52] U.S. Cl. .................................. 210/640; 210/321.72
[58] Field of Search .................... 210/490, 500.29, 634, 210/640, 644, 649-654, 321.6, 321.72, 500.21

[56] References Cited

U.S. PATENT DOCUMENTS

4,877,528 10/1989 Friesen et al. ................. 210/500.29
4,976,897 12/1990 Callahan et al. ..................... 210/490

*Primary Examiner*—Frank Sever
*Attorney, Agent, or Firm*—Alfred D. Lobo

[57] ABSTRACT

A pervaporation membrane comprises a porous, preferably microporous support which is filled from its exterior to its interior surface with a solid, non-removable organophilic polymer which exhibits permselective properties. A support so filled with the polymer and at least 20 μm thick, preferably 50 μm to about 200 μm thick, referred to as a "thick" film, will preferentially block out water in which a target component is dispersed, yet allow diffusion of the target component. The polymer is forced through the pores of the support, which pores, before they are filled, provided open fluid communication between the opposed interior and exterior surfaces of the support. Preferably, impregnated polymer exudes through and overflows the pores, spreading upon the opposed surfaces of the porous support, and providing opposed coextensive films on either side of the porous support, the films being interconnected by microtendrils of polymer in the pores and channels of the support. A module having microporous hollow fiber membranes is impregnated after the module is constructed. The fibers are through-impregnated with a solution of the polymer and the excess swept away with a sweep gas. In a process for separating plural target components from an aqueous stream, the pervaporation module with "thick film" pervaporation membranes, will provide a separation factor at least double that of a conventional module with "thin film" membranes coated upon a microporous support and not filling its pores.

29 Claims, 3 Drawing Sheets

SUPPORTED PERVAPORATION MEMBRANE AND MODULE CONTAINING ARRAYS OF MEMBRANES

BACKGROUND OF THE INVENTION

This invention relates to a two-component membrane for separating at least one liquid from a mixture of plural liquids by pervaporation; to a process for preparing the membrane in one of plural arrays in a module for effecting a desired separation; and to the module which contains plural arrays of the membrane. This pervaporation process is a membrane process specifically for the removal and concentration of an organic compound from an aqueous phase in which it the organic compound is present in a minor proportion by weight. In a specific application, pervaporation is used to separate at least one volatile organic compound ("VOC" for brevity) from water in which the VOC is present in less than 1 percent by weight.

More particularly, the invention relates to a pervaporation membrane consisting essentially of a microporous support which is impregnated and fully penetrated from the support's interior surface to its exterior surface, by a permselective essentially non-porous, solid, non-removable organophilic polymer, permeable to the target component. Because the organophilic polymer fills the pores and channels of the support, the pervaporation membrane is at least as thick as the support within it; and because the pores and channels are through-impregnated from surface to surface, the support is said to be "filled" with the polymer.

By "non-removable" we mean that the polymer cannot be removed from the support without destroying the microporous structure of the support. The non-porous organophilic polymer is referred to herein as a "filling" which is contained within a microporous support. Because the support is to be filled its pores and channels are permeable to the organophilic polymer. The term "coating" is used herein to denote the filling in combination with interior and exterior "skins" of the organophilic polymer, as explained in greater detail herebelow. A preferred organophilic polymer is an elastomer, preferably a silicone polymer, and when the support is impregnated with an elastomer, the support is referred to as being elastomer-permeable.

The microporous support, by itself, has essentially no membranous function with respect to the target component to be separated by pervaporation. As will be more fully explained herebelow, the function of the microporous support is to reinforce the coating which essentially completely impregnates the support. Therefore the impregnated support has essentially only a pervaporation function, namely, to separate the desired target component from a mixture containing it. The microporous support in our pervaporation membrane is therefore referred to herein as a "non-membranous microporous support" (or 'NMMS' for brevity). In addition to impregnating walls of the NMMS, the coating may cover the exterior and/or interior surfaces of the walls, forming exterior and interior "skins", respectively, but the impregnated support is at least about 20 μm (micrometers or microns) thick, this being the thinnest cross-section of a wall of a microporous support believed to be now available.

This invention also relates to a pervaporation process for separating one or more desired liquids (target components) from a mixture containing them, based on the difference in the rate of permeation of the desired liquid(s) to be separated, from that of at least one other liquid in the mixture. Separation therefore provides a permeate having a different concentration of the desired liquid(s) compared with the concentration of the at least one other liquid in the mixture. Such a difference in permeation rate occurs when there is a chemical potential gradient for the target component between two zones, the higher potential being present in the feed zone through which the mixture flows, and the lower potential being present in the permeate zone.

The term "microporous support" is used, though the NMMS has relatively large pores through which a relatively viscous elastomer can flow under less than 790 kPa absolute (100 psig) pressure without damaging the integrity of the microporous support.

Still more particularly, this invention relates to the manufacture of a pervaporation module for the removal of a trace amount of a target organic compound, typically a VOC from an aqueous phase, or a VOC from an oil-water emulsion. The removal is effected by using a multiplicity of hollow two-component membranes (referred to as "hollow fibers") held in arrays housed in a module constructed to define a feed zone and a permeate zone. By "trace amount" we refer to a concentration which is typically less than 1% by weight.

In a typical pervaporation module, liquid feed flowing through the feed zone is in contact with one side of the two-component membrane consisting essentially of an essentially non-porous or "dense" organophilic polymer supported on the NMMS (non-membranous microporous support). The NMMS is necessary only because known organophilic polymers having desirable flux-differentiation characteristics lack sufficient strength as a self-supporting layer. By "flux" we refer to the permeation rate of the permeate per unit surface area. In the thickness suitable for use as a coating in this invention, a suitable organophilic polymer is non-self-supporting, and it is only such a non-self-supporting coating which is of interest as a component of a two-component hollow fiber.

In such a hollow fiber, the NMMS per se, may be a relatively insignificant barrier to the passage of both water (or organic liquid) and target VOC. When the NMMS is filled with organophilic polymer passage of water is restricted to that which diffuses through the coating. Therefore any pores in the coating, particularly such pores referred to as "pin holes" typically found in thin layers of polymer deposited on the surface of a typical porous permselective membrane, vitiate the performance of a pervaporation module. In an effective pervaporation module, both water (or organic liquid) and VOC are absorbed into the coating and diffuse through it to the permeate zone from which the VOC and some water (or organic liquid) are drawn off by vacuum.

The pores of prior art porous supports served only to allow the polymer to form a 'compact membrane' to bridge across the pores, as for example clearly illustrated in U.S. Pat. No. 4,230,463 to Henis et al (class 55/subclass 16). However, as stated therein, "though such compact membranes are fairly selective, one of their main disadvantages is low permeate flux due to the relatively large thickness associated with the membranes." (see col 2, lines 36-39). Yet we have found such a compact membrane to be ideal, provided it is thick enough to contain a NMMS. Further, unlike the '463 membrane, the separation properties of our two-component membrane are principally determined by the coating as opposed to the NMMS. We do not use a porous separation membrane such as is used in the '463 multicomponent membrane (see col 6, lines 33-37). Essentially the same emphasis on a "thin" coating over the outer surface of a membrane composite is taught in U.S. Pat. No. 3,980,456 to Browall.

The direction of the art towards thinner coatings, rather than thicker ones, over a porous support is also evidenced in U.S. Pat. No. 4,978,451 to Taylor. He used a porous support but made sure that the layer coating the support was ultrathin (as thin as 1 $\mu$m) yet with "sufficient structural integrity while being significantly more efficient as a diffusion membrane when compared to a thicker unsupported membrane of the same type". (see col 1, lines 44-49). This choice of a very thin rather than a thick membrane, was made by Blume et al in U.S. Pat. No. 4,931,181.

To concentrate the VOC greatly, compared with its concentration in the feed, the coating of our two-component membrane is distinguished by having a relatively high flux for the VOC and a relatively low flux for water. The concentration of the VOC in the permeate is by a factor of at least 10, and preferably by a factor of 50, 100, 1000 or 10,000. The VOC is therefore referred to herein as being concentrated by orders of magnitude relative to its concentration in the feed. When the desired concentration of VOC is achieved in the permeate zone, separation of the VOC from the water is relatively easy, if such separation is desired to be made.

For the most part in this specification, for convenience, and to facilitate understanding the thrust of the invention, we shall refer to a separation of a VOC from water, it being understood that the VOC could also be recovered from an organic liquid, or mixture of water and organic liquid, in an analogous manner.

The general theoretical technical basis and considerations relating to the foregoing technology are set forth in a paper titled "A Technico-Economical Evaluation of Pervaporation for Water Treatment" presented by Pierre Cote and Chris Lipski at the Fourth International Conference on Pervaporation Processes in the Chemical Industry, held in Fort Lauderdale, Fla. from Dec. 3-7 1989, and, in an article titled "The Use of Pervaporation for the Removal of Organic Contaminants from Water" by Chris Lipski and Pierre Cote in *Environmental Progress* Vol 9, No. 4, pg 254-261, the disclosures of which are incorporated by reference thereto as if fully set forth herein. The thrust of the disclosures relating to improving the performance of a pervaporation membrane pointed out that a relatively thick discriminating layer from 30 $\mu$m to 100 $\mu$m, is more effective than a thinner layer because the thicker layer decreases the flux of water through it far more than the thinner layer, without significantly reducing the flux of the VOC. The theoretically derived conclusions were experimentally confirmed by using homogeneous silicone fibers having thick walls. But such fibers have inadequate strength for practical use. The problem of providing thick-walled hollow fibers which functioned as thick pervaporation membranes with adequate strength, was solved by our invention.

Our discovery that thick permselective membranes for use in pervaporation were more effective than thin membranes was referenced by Henry Nijhuis in his Doctoral thesis titled "Removal of Trace Organics From Water by Pervaporation", published in October 1990, relevant portions relating to the formation, use and effectiveness of a thick film are incorporated by reference thereto as if fully set forth herein. Nijhuis confirmed that water fluxes, which are independent of the concentration of organics in the aqueous solution, appear to be inversely proportional to the effective thickness of the membrane. In a cost analysis for pervaporation with silicone rubber membranes the total permeate flux (mainly water) through 10 $\mu$m membranes was estimated at 130 g/m$^2$ at 99% recovery. The condensation costs for the permeate handling are reduced from Dfl 1,040,000 (US$ 520,000) to Dfl 80,000 (page 154) using a less permeable yet still quite thick ethylene propylene terpolymer.

Rather than switching membranes (because ethylene propylene terpolymer is difficult to work with) Nijhuis confirmed (page 44) that a 100 $\mu$m thick silicone membrane could be substituted for the 10 $\mu$m silicone membrane with no significant reduction in the organic removal but it would reduce the water handling requirement by a factor of 10 (page 40) and reduce the condensation costs to Dfl 104,000.

It follows that an ideal module for separation of a VOC from polluted water comprises a multiplicity of hollow fibers housed in a hydrodynamically efficient module, each fiber having a thick coating of organophilic polymer, at least 20 $\mu$m thick, preferably from 30$\mu$m-200 $\mu$m thick, having suitably disposed therewithin, the NMMS. The polymer is chosen because of its unique affinity for the VOC to be removed from the feed zone, and the polymer's propensity to release the VOC in the permeate zone where the partial pressure of the VOC is much less than in the feed zone at normal operating temperature in the range from about 20° C. to 60° C. At higher operating temperatures than normal, namely 60°-150° C., thicker membranes up to 500 $\mu$m thick may be used.

The problem is that there is no known method for controllably depositing a thick coating which not only fills a suitably porous wall of a support but also coats both, its exterior and interior surfaces, particularly when the wall is that of a microporous hollow fiber. A conventional coating which is deposited by plasma coating is found to be less than 2 $\mu$m thick, and repeating to build up the thickness of the coating is neither practical nor economical.

Another problem is that, once coated with a desirable coating, a hollow fiber is difficult to incorporate into one or more arrays of hollow fibers, which arrays are to be held in fluid-tight relationship in a module, because of their polymeric surfaces. Typically such arrays are potted with a synthetic resinous material chosen to tightly adhere to the surface of the coating, but the adhesion is generally insufficient to provide a relatively permanent fluid-tight bond unless the physical and chemical properties of the organophilic polymer match those of the potting resin.

Since silicone rubber is the organophilic polymer of choice it will now be apparent why it is difficult to seal a multicomponent membrane by potting it. Silicone rubbers are known to be highly resistant to being adhesively secured to synthetic resinous materials which have been found suitable for potting compounds.

SUMMARY OF THE INVENTION

It has been discovered that a two-component membrane having a filling of a solid, non-removable organophilic polymer at least 20 $\mu$m thick, and preferably in the range from about 50 μm to about 200 μm thick, will effectively block out the carrier liquid, typically water, in which a target component is dispersed, yet allow diffusion of the target component, if the polymer is forced through the pores of a porous support, which pores provide open fluid communication between opposed surfaces of the support, so as to impregnate the pores essentially completely. Preferably, the organophilic polymer overflows the pores and spreads upon the opposed surfaces of the porous support, providing opposed coextensive films on either side of the porous support, the films being interconnected by microtendrils of polymer in the pores and channels of the support ("pores" for brevity).

It is therefore a general object of this invention to provide a supported non-porous pervaporation membrane for separating a target component from a liquid in which the target component is dispersed, the membrane comprising (i) a porous support means at least 20 μm thick, which provides a multiplicity of pores and channels which place interior and exterior surfaces of the support means in open fluid communication, and, (ii) an organophilic polymer which substantially completely fills the pores and channels so as to be affixed within said pores in a manner alternative to chemical bonding, provided the material of the porous support and that of the organophilic polymer are different. The organophilic polymer provides a coating within which the porous support is disposed so that the thickness of the coating is at least that of the distance between the interior and exterior surfaces of the porous support.

It is a specific object of this invention to provide a pervaporation membrane having a coextensive skin less than 50 μm thick, of organophilic polymer on at least one surface of a porous support means from 30 μm to 200 μm thick, and a multiplicity of microtendrils, formed by channels in the porous support means, which anchor the skin to the porous support means. A pervaporation membrane having an overall thickness of 500 μm typically has a permeation rate too slow to be practical.

It is another specific object of this invention to provide a pervaporation membrane having two spaced-apart non-self-supporting skins or layers of an organophilic polymer interconnected by microtendrils of the polymer; the microtendrils extend through the throughpassages of an open-cell microporous support, which microtendrils and microporous support in combination, provide the strength of the support and a thick coating of organophilic polymer which is effectively much greater than the thickness of either skin on each side of the support.

It still another specific object of this invention to provide a pervaporation membrane at least as thick as the wall of the porous support through which it is infiltrated, the membrane having a higher overall flux than a membrane one-half as thick, but not having a higher mass transfer rate for the target component; and, to maximize the flux of the target component and simultaneously minimizing the flux of water.

It has also been discovered that the pervaporation membrane of this invention may be formed within a module, after a microporous support means is conventionally disposed within the module, for example by potting with a potting resin, or by securing hollow fibers in arrays without potting the fibers. After the module is conventionally assembled, the porous support means are through-impregnated with an organophilic polymer of choice suitably dissolved in a liquid to provide sufficiently low viscosity to pass from the interior surface of the support means to the exterior, or vice versa.

It is therefore a general object of this invention to provide a method for making a pervaporation module, comprising, constructing a module with a microporous support means fluid-tightedly disposed within a shell to provide separate feed and permeate sides, introducing an organophilic polymer into the module on one side, and increasing the pressure exerted upon the organophilic polymer until it fills pores and channels in the support means and exudes into the other side. Preferably, a module is constructed with arrays of hollow fibers transversely disposed across the flowpath of feed and the organophilic polymer is introduced under pressure through the lumens of the fibers until the polymer flows outwardly to the surface. The polymer within the fibers is then blown through, or drained away, and the polymer allowed to cure in the channels of the support means.

Still further, a highly effective process has been discovered for separating a target component from an aqueous feedstream in which it is mixed, comprising, (a) contacting the exterior (feed side) of the above-described pervaporation membrane with the feedstream, wherein the pervaporation membrane exhibits a selectivity greater than 10 which results in concentrating the target component, (b) maintaining the interior (permeate side) of the membrane at a lower chemical potential for the target component than the chemical potential the exterior surface, (c) permeating the target component into and through the organophilic polymer and, (c) withdrawing from the permeate side of the pervaporation membrane, a permeate wherein the proportion of the target component is enriched by at least an order of magnitude relative to its concentration in the feedstream.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations, like reference numerals refer to like elements, and in which.

DETAILED DESCRIPTION OF PREFERRED EMBODIMENTS

The multicomponent membrane of this invention is widely applicable in any separation where the component to be separated from a fluid mixture has a higher affinity for, or a higher permeability, through the coating of organophilic polymer than the remaining components of the mixture. The two-component membrane can be in the form of a sheet, whether planar or arcuate, or it may be in the form of hollow fibers or filaments having a porous separation membrane or substrate having through-pores, upon either side of which separation membrane, twin films of an organophilic polymer of choice are deposited so that the polymer wets the porous membrane and travels through the pores to interconnect the twin films with microtendrils of the polymer.

Preferred are hollow organic fiber membranes. The outside diameter of such a fiber is at least 100 $\mu$m and may be as large as about 3 mm, typically being in the range from about 0.4 mm to 2 mm. Ceramic/metallic tubular membranes have an outside diameter in the range from about 3 mm to about 13 mm. The larger the outside diameter the less desirable the ratio of surface area per unit volume of module. The wall thickness of a polymeric organic fiber is at least 20 $\mu$m and may be as much as 300 $\mu$m, typically being in the range from about 5% to about 40% of the outside diameter of the fiber.

Factors which influence the effectiveness of the two-component membrane include the permeability constants of the polymer and porous support, the total cross-sectional area of the pores through which the microtendrils run relative to the total cross-sectional area of the porous support, the relative thickness of the porous support, and the thicknesses of the polymeric films on each side of the support, inter alia. In general, whether for making a separation of a gaseous component or a liquid component, the degree of separation which can be effected by the multicomponent membrane is determined by the relative resistance to the diffusion of the component to be separated through the discriminating layer, since diffusion through the pores of the support is no longer a factor because they are filled with organophilic polymer.

It is preferred, for the separation of a halocarbon (halogenated hydrocarbon) from an aqueous feedstream, to use a porous support which can be easily wetted by a solution of the organophilic polymer, and which has through-pores or channels. The diameter of pores in the support are preferably larger than the effective cross-section, or even the length of a molecule of the organophilic polymer, preferably being in the range from about 1 $\mu$m to about 5 $\mu$m in effective cross-section.

In a preferred embodiment, the microporous support such as a polyolefin, particularly polypropylene, polycarbonate, or polysulfone has a total surface area to total pore cross-sectional area in the range from about 20:1 to about 2:1.

Though the direction in which the porous support is through-impregnated with the organophilic polymer, is not narrowly critical, it is preferred to impregnate the support radially outwardly. For example, when a hollow fiber is to be impregnated, a solution of the organophilic polymer is flowed under pressure through the bore of the fiber until the polymer exudes through the pores and onto the exterior surface of the fiber. After this has been done, the bore of the fiber is purged with an inert gas, typically nitrogen.

Through-impregnation of the support by filling the pores and channels eliminates the potential for condensation in the pores and channels of the porous support. Such condensation is a problem with conventionally coated membranes in which the pores are not filled with organophilic polymer when there is a fast shut-down, as for example, in an extreme case, a power failure. Condensation within the pores of a support typically damages the support irretrievably.

The conditions of pressure, temperature and time over which a porous support is impregnated will depend upon the physical characteristics of the organophilic polymer and the porous support, and are determined by a little trial and error such as one skilled in the art is accustomed to make. When the exuded polymer is cured, it forms an exterior skin the thickness of which is always less than one-half the spacing of adjacent support members in an array. If thicker, adjacent arrays would be bonded, one to another, when the polymer is cured.

The material used for the porous support is chosen for its wettability by the organophilic polymer and the characteristics of its pore size and distribution. Such porous supports are typically organic polymers which can be extruded or cast as a laminar sheet, extruded or wet-spun as a hollow fiber, or otherwise fabricated to provide porous separation membranes. A porous membrane may be cast from a solution of the polymer in a good solvent for it, by casting the solution into a non-solvent for the polymer. The precise conditions for casting or spinning, and treatments subsequent to the initial formation of the support, influence the porosity and pore distribution within the support. Forming the porous support is a conventional skill known in the art and forms no part of this invention.

Typical polymers suitable for the porous support may be derived from polysulfones such as Udel P3500; poly(styrenes); polyolefins such as polypropylene; polytetrafluoroethylene; polyvinylidene fluoride; polycarbonates such as Lexan; polyimides; cellulosic polymers; and polyamides such as Nomex, Trogamid-T or Grilamid; etc. The identifications of the polymers are by trademarks. In addition, microporous ceramics, glass, carbon and sintered metal may be used, all of which materials (in common) have micropores extending from one surface (feed side) to the other (permeate side).

Hollow fibers may be formed from the foregoing porous support materials for use in arrays for modules, as well as sheet microporous material for use in spiral wound modules.

Selection of the porous support is typically made on the basis of resistance to heat, resistance to solvents, and mechanical strength, particularly if the pervaporation membrane is to be used under elevated pressure in the range from above 1 atm to about 5 atm, to maintain the feed as an aqueous phase at a temperature above 100° C. The porous support is self-supporting and provides all the structural support for the coating which, in the thicknesses employed, is non-self-supporting.

A preferred porous support is made from a polysulfone having an average molecular weight suitable for making film or fibers, at least about 10,000.

The organophilic polymer for the coating is typically a synthetic addition or condensation polymer though some natural materials may be used. Such polymers include synthetic rubbers, natural rubbers, and relatively high molecular weight organic prepolymers; poly(siloxanes) crosslinked to provide silicone rubber; poly(isoprene), copolymer of α-methylstyrene and poly(siloxane); polystyrene having a degree of polymerization of about 2 to 20; an aliphatic hydrocarbyl-containing organic compound having about 14 to 30 carbon atoms; polysilazanes; polyurethanes; poly(epichlorohydrin); polyamines; polyimines; polyamides; etc. and they are solution-impregnated, each with an appropriate solvent. Preferred number average molecular weights of such polymers range from about 1000 to about 100,000 to go through the micropores. A preferred viscosity is arrived at by diluting the polymer with solvent. The preferred viscosity chosen depends upon the pore size, the hydrophilicity of the support, and the pressure under which the support is to be impregnated. It must be borne in mind that, the diameters of the micropores of the support must also be larger than the cross-section of a molecule of catalyst used to cure the organophilic polymer, and preferably larger than the effective length of a catalyst molecule.

Most preferred for the coating are poly(siloxanes) crosslinked to provide silicone rubber, comprising aliphatic or aromatic moieties and often having repeating units containing 1 to about 20 carbon atoms. The molecular weight of the poly(siloxanes) may vary widely, but in general is at least 10000. As applied to the supporting membrane it is preferred that the molecular weight be even higher, up to about 300,000. The poly(siloxanes) may be crosslinked in the presence of a crosslinking agent to provide the desired molecular weight. The specific characterization of useful poly(siloxanes) is not necessary herein since they are commercially available, and their composition forms no part of this invention. Such materials are RTV polymers available under the trademarks of General Electric, and Dow Corning.

Figure 1:
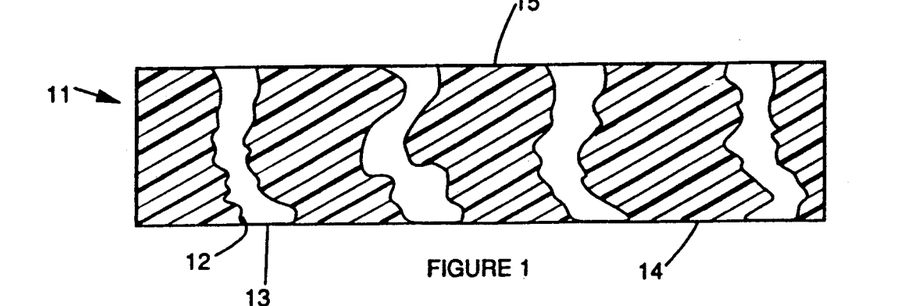
FIG. 1 is a schematic representation, in side elevational view, of the wall of the pervaporation membrane, from the interior and exterior surfaces of which wall, polymer has been removed before it cured, so the two-component membrane is "skinless".

Referring to the drawing, there is shown a schematic illustration in FIG. 1 of a preferred embodiment of the pervaporation membrane, referred to generally by the reference numeral 10, comprising the microporous support means 11 having channels 12 therethrough. The channels are filled with an organophilic polymer 13, for example, silicone rubber which is appropriately diluted with solvent to provide a suitable viscosity, and the excess rubber removed with a stream of nitrogen gas, so that the inner surface 14 and the exterior surface 15 of the support 11 are essentially free of silicone. When cured, the polymer in the channels form microtendrils which are shaped by the channels. Such a membrane may be formed by impregnating the support as described, then flushing both exterior and interior surfaces with a solvent for the polymer 13. In practice, a thin interior and exterior skin always remains.

Figure 2:
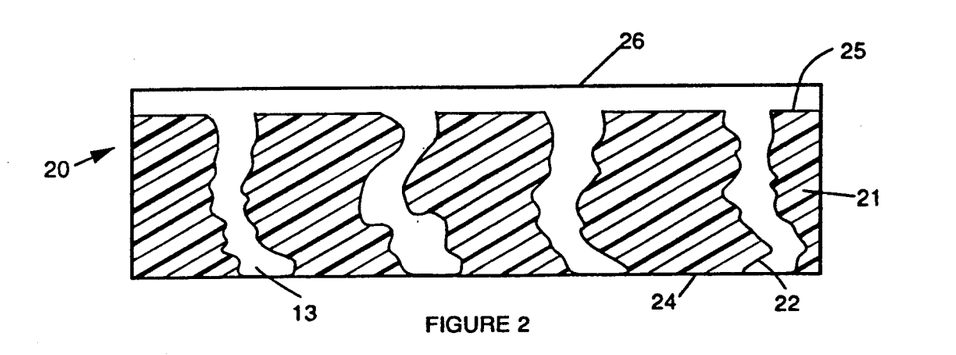
FIG. 2 is a schematic representation of an alternative embodiment, in side elevational view, of the wall of a hollow fiber support means. Some of the polymer exuding onto the exterior surface of the hollow fiber forms an exterior skin which is cured. Polymer from the interior of the hollow fiber is removed before the polymer is cured.

An alternative embodiment of the wall 21 of a hollow fiber pervaporation membrane referred to generally by reference numeral 20, is shown in FIG. 2. Channels 22 of the wall 21 are filled with organophilic polymer 13 and some of it which exudes onto the outer surface 25, is allowed to cure to form an exterior skin 26. It is desirable to provide an exterior skin when the aqueous feed is to be flowed over the exterior surfaces of the membranes because the larger area of skin (compared to the effective area of a "skinless" surface) more effectively adsorb the VOC to be separated. The adsorbed VOC then travels through the microtendrils to the interior surface. The polymer within the hollow fiber is removed with solvent before it cures, leaving an essentially "skinless" interior surface 24. The microtendrils anchor the exterior skin to the surface of the pervaporation membrane. As in the embodiment shown in FIG. 1, in practice, a thin interior skin remains.

Figure 3:
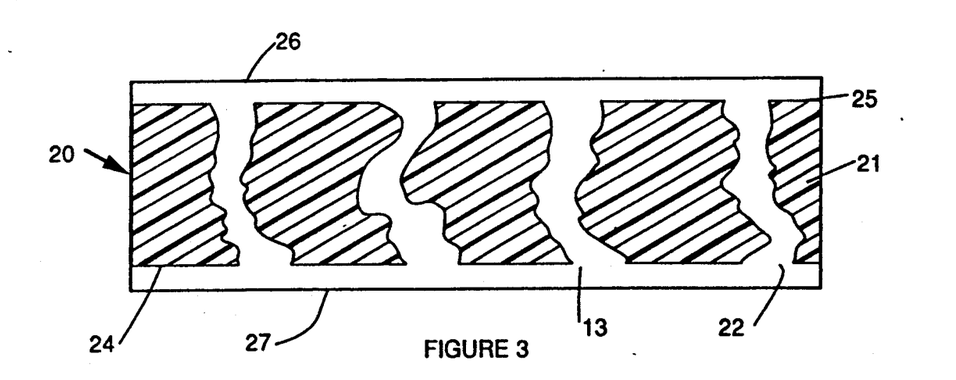
FIG. 3 is a schematic representation of still another alternative embodiment, in side elevational view, of the wall of a hollow fiber support means. Some of the polymer exuding onto both the exterior and interior surfaces of the hollow fiber forms exterior and interior skins, respectively, when cured. Excess polymer from the interior of the hollow fiber is removed before the polymer is cured.

Still another and most preferred embodiment is shown in FIG. 3 in which channels 22 of the wall 21 of the hollow fiber pervaporation membrane 20 are filled with silicone rubber and allowed to exude onto both the exterior and interior surfaces 25 and 24 respectively, of the wall, and to be cured so as to leave exterior and interior skins 26 and 27 on the pervaporation membrane. The thickness of the skins is controlled by controlling the viscosity of the solution (of organophilic polymer) and the velocity of the sweep gas used. The desired overall thickness of the membrane is arrived at by a little trial and error such as one skilled in the art would expect to indulge in.

Figure 4:
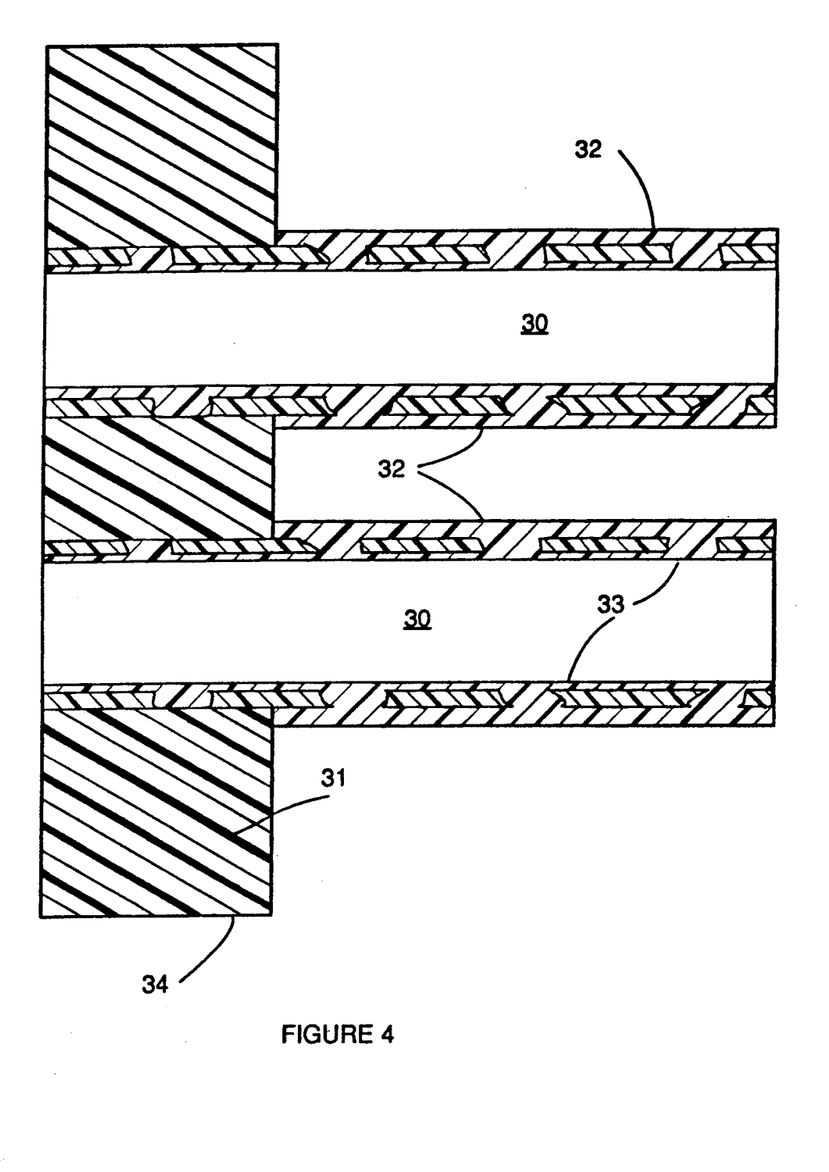
FIG. 4 is a schematic representation of a portion of an array in which hollow fiber membranes are not potted, showing how the coating is disposed around the fibers near the terminal portions of the fibers.

FIG. 4 schematically illustrates a typical array of hollow fibers which have been potted and thereafter impregnated. As shown, hollow fibers 30 are potted in potting resin 31. After being impregnated, the fibers 30 are shown coated with exterior and interior coatings 32 and 33 respectively which do not extend into the potting resin of header 34. If not post-impregnated, the impregnated fibers could not have been potted because the potting resin could not non-displaceably hold the fibers in fluid-tight engagement in the header 34.

Figure 5:
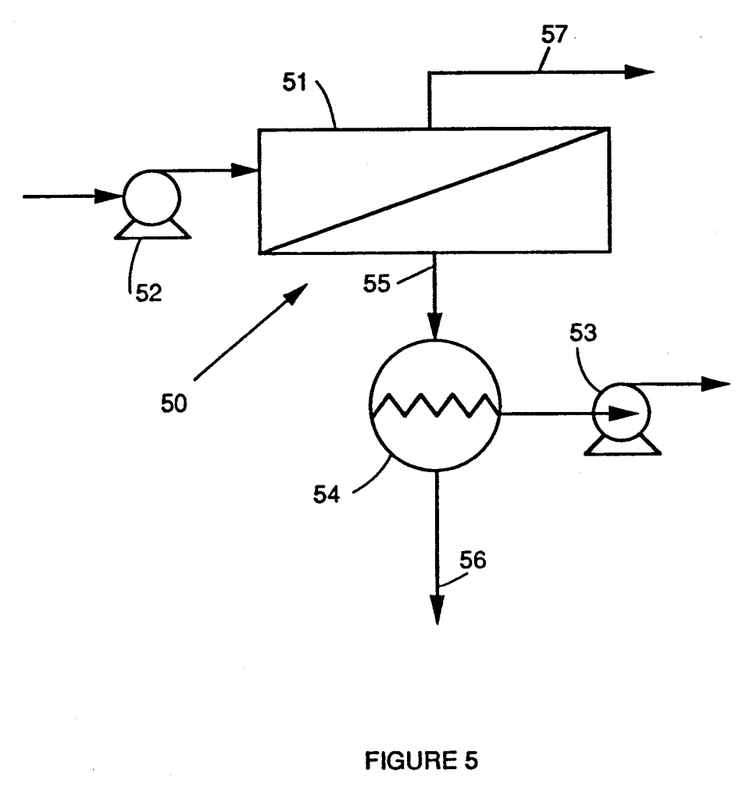
FIG. 5 is a schematic representation of a pervaporation treatment system showing its essential components.

Referring to FIG. 5 there is shown a simplified pervaporation system referred to generally by reference numeral 50 in which a bank of pervaporation modules 51 are fed by pump 52 with an influent feed of water polluted with trichloroethylene (a VOC). A vacuum pump 53 maintains a suitably low pressure in the range from about 0.1 mm to 1 mm of Hg, on a condenser 54 into which permeate 55 is drawn from the permeate side of the modules and condensed. Condensate 56 is removed for further separation by distillation. The effluent 57 from the modules is water which has been depleted of the VOC.

The module used may be any conventional module fitted with suitable microporous support means, except that the support means are post-infiltrated with the organophilic polymer so that each component of the support means, whether sheet or hollow tube, is through-impregnated with the polymer. The support means therefore cannot perform their original permselective function but only the function of a pervaporation membrane. A typical module has a shell having entrance and exit passages and a pair of end closures with fluid couplings. Whether in sheet form, or tubular, the support means are held as an assembly, non-displaceably near their terminal portions which are free of the organophilic polymer to be used to coat those portions of the support means which are exposed in a through-passage within the shell. A stack of assemblies is fitted in the shell. The terminal portions of the support means are secured in a synthetic resinous mass, whether such mass is derived from potting, or without potting. The walls of the support means are through-impregnated with the organophilic polymer which is cured in-place therein after excess polymer is swept away with a sweep gas. Entrance and exit passages in the shell are in open communication with the through-passage, and sealing means between the through-passage and the entrance and exit passages respectively, allow the module to discharge its designated purpose.

Preferred support means are hollow fiber support means assembled for use in a module as described in U.S. Pat. Nos. 3,528,553; 3,884,814; 3,993,816; 4,001,110 and copending application Ser. No. 07/569,405 filed Aug. 17, 1990, the disclosures of each of which are incorporated by reference thereto as if fully set forth herein. Most preferred is the use of arrays of hollow fibers assembled in a stack disposed in the shell so that the feedstream is flowed transversely, preferably at right angles, to the planes in which the arrays lie.

Most preferred material for the hollow fibers is Celgard brand polypropylene obtained from Celanese Corp.; and, for the organophilic polymer is a silicone rubber, for example RTV 3140, Sylgard 182 and Sylgard 184 from Dow Corning Co.; or, RTV 627 from General Electric Co., used with about an equal amount of catalyst at a viscosity of about 2000 cp with a SS4155 primer, and cured in the range from 25° C. to 150° C. Some silicone rubbers are preferably used with a primer, others are used "primerless". The primer is used simply to facilitate proper deposition of the silicone and has no effect on the pervaporation characteristics of the membrane. It is therefore not deemed an essential component of the pervaporation membrane.

A comparison between a "thick" film membrane of this invention with a prior art "thin" film for a spiral wound module used to separate trichloroethylene from water, is presented in Table 1 below:

TABLE I

| COMPARISON OF THICK vs. THIN FILM MEMBRANES | | |
|---|---|---|
| Test results | 30 μm thk | 2 μm thk |
| Mass transfer coefficient (m/s × 10⁵) | 6.71 | 7.50 |
| Membrane area (m²) | 218 | 195 |
| Condensate (kg/m³ treated) | 1.78 | 23.8 |
| Separation factor | 558 | 42 |
| Energy used (kWh/m³ treated) | 3.2 | 36.2 |
| ΔT through system (°C.) | −0.7 | −15.5 |
| Costs | | |
| Capital cost ($ in thousands) | 91. | 107.5 |
| Energy cost ($/m³ treated) | 0.16 | 1.81 |
| Treatment cost ($/m³ treated) | 0.79 | 2.51 |

Though a superficial examination of mass transfer coefficients and membrane areas in a comparison of "thick" vs "thin" membranes would indicate that "thin" is better than "thick". Upon actually making the experimental runs however, it is found that the other criteria, namely separation factor, energy used, etc. demonstrate that "thick" is better than "thin". It will now be understood how the prior art happened to miss the discovery and operated on the opposite premise.

As with TCE for which a comparison was specifically provided, the separation factor with a 'thick film', as described herein, for any other target component is typically at least double the separation factor obtained with a thin film as used in the prior art, and is often 10 times greater, or more. By "thin film used in the prior art" we refer to one which fails to fill the pores, the thin film being typically less than 2 μm thick. In addition to a halocarbon, a phenol, ketone or ether such as are found in an industrial wastewater stream, may also be separated.

The VOCs listed in the following Table 2 were together present in a polluted water stream which was to be discharged from a waste landfill as a "leachate". This stream was collected and treated in a "transverse flow hollow fiber" module as exemplified by one more fully described in copending patent application Ser. No. 07/569,405 filed Aug. 17, 1990, the disclosure of which is incorporated by reference thereto as if fully set forth herein. The hollow fibers are Celgard polypropylene through-impregnated with a 10% solution in hexane of GE RTV627 silicone rubber so as to be cured having exterior and interior skin. The overall thickness of the pervaporation membrane was 165 μm.

TABLE 2

| TREATMENT OF MIXED VOCs IN POLLUTED WATER | | | |
|---|---|---|---|
| Compound | Concentration μg/L | k m/s × 10⁵ | Selec'ity |
| Acetone | 9200 | 0.03 | 150 |
| Methylene chloride | 64 | 1.67 | 7700 |
| Ethylbenzene | 27 | 2.56 | 10600 |
| Chloroform | 26 | 2.65 | 11200 |
| Benzene | 60 | 3.31 | 13900 |
| 1,1-dichloroethane | 6.5 | 3.88 | 16700 |
| Chlorobenzene | 59 | 5.05 | 21300 |
| Toluene | 17500 | 6.42 | 26900 |
| o-Xylene | 92 | 7.64 | 32300 |
| m- & p-Xylene | 20 | 9.53 | 40600 |
| TETCA/TETCE* | 5 | 11.50 | 61400 |
| Bromodichloromethane | 16 | 17.1 | 75000 |

*tetrachloroethane/tetrachloroethylene

As above, it is typically desirable to separate plural target components from a wastewater stream because more than one contaminant is usually present. It is most preferred to do this with a module containing plural arrays of hollow fiber pervaporation membranes, each array being proximately disposed relative to another in successive vertical planes so that the aqueous feedstream is flowed over the assembly of arrays in a direction transverse to the planes in which the arrays lie.

It is recognized that, botched efforts to coat a microporous support, made by Taylor, Henis et al., Blume et al., and others who sought to provide as thin a permselective membrane as possible, might have unwittingly resulted in a through-impregnated membrane, or even one with a skin. However, had any one of the foregoing made such a membrane they would have discarded it as being an embodiment which was opposite to the one they sought to make. They therefore missed making the discovery that a thick membrane was more effective than a thin one in a pervaporation module. Had they tested the membrane, they would have made the discovery which they missed.

Having thus provided a general discussion, described the overall pervaporation process in detail and illustrated the invention with specific examples of the best mode of making a pervaporation membrane and carrying out the process, it will be evident that the invention has provided more effective separation with a thicker membrane than a thinner one, which discovery was contra to the solutions provided by the prior art. It is therefore to be understood that no undue restrictions are to be imposed by reason of the specific embodiments illustrated and discussed, except as provided by the following claims.

We claim:

1. A non-porous supported pervaporation membrane which exhibits selective permeation to at least one target component to be separated from an aqueous liquid in which the target component is dispersed, said membrane comprising,
    (i) a relatively thick porous support means at least 20 μm thick, having a multiplicity of pores and channels therewithin placing interior and exterior surfaces of said support means in open fluid communication, and, (ii) a solid, non-removable organophilic polymer which exhibits selective permeation for said at least one target component, said polymer substantially completely filling said pores and channels and affixed within said pores in a manner alternative to chemical bonding so that the thickness of said polymer is at least the distance between the interior and exterior surfaces of said porous support, provided the material of said porous support means and of said polymer are different.

2. The pervaporation membrane of claim 1 wherein said support filled with said organophilic polymer is essentially unable to provide a membranous function with respect to the target component to be separated by pervaporation.

3. The pervaporation membrane of claim 2 wherein said support is a microporous support having a pore diameter in the range from about 1 $\mu m$ to about 5 $\mu m$.

4. The pervaporation membrane of claim 1 wherein said support has interior and exterior surfaces, and is selected from the group consisting of a microporous organic polymer, ceramic, glass, carbon and sintered metal, wherein said micropores extend from said interior surface to said exterior surface.

5. The pervaporation membrane of claim 4 wherein said thick support is at least 20 $\mu m$ but less than 500 $\mu m$ thick.

6. The pervaporation membrane of claim 5 wherein said support is through-impregnated with said organophilic polymer so as to provide coextensive interior and exterior skins of said polymer, spaced apart by microtendrils of said polymer in said pores.

7. The pervaporation membrane of claim 5 wherein said interior and exterior skins are less than 50 $\mu m$ thick.

8. The pervaporation membrane of claim 5 wherein said pervaporation membrane exhibits a separation factor at least double that of a thin film of the same material which fails to fill said pores.

9. The pervaporation membrane of claim 8 wherein said support is a microporous organic polymer selected from the group consisting of polysulfone, poly(styrenes), polyolefins, polytetrafluoroethylene, polyvinylidene fluoride, polycarbonate, polyimide, cellulosic polymer, and polyamide.

10. The pervaporation membrane of claim 9 wherein said organophilic polymer is selected from the group consisting of a natural rubber and a synthetic rubber.

11. The pervaporation membrane of claim 10 wherein said organophilic polymer is selected from the group consisting of poly(siloxanes) crosslinked to provide silicone rubber; poly(isoprene); copolymer of $\alpha$-methylstyrene and poly(siloxane); polystyrene having a degree of polymerization of about 2 to 20; an aliphatic hydrocarbyl-containing organic compound having about 14 to 30 carbon atoms; polysilazanes; polyurethanes; poly(epichlorohydrin); polyamines; polyimines; and polyamides.

12. The pervaporation membrane of claim 11 wherein said porous support is a hollow fiber.

13. The pervaporation membrane of claim 8 wherein said hollow fiber support has an outside diameter in the range from 100 $\mu m$ to 3 mm.

14. A non-porous pervaporation membrane having a coextensive skin of a solid non-removable organophilic polymer less than 50 $\mu m$ thick on at least one surface of a porous support means from 30 $\mu m$ to 200 $\mu m$ thick, said polymer exhibiting selective permeation to at least one target component to be separated from an aqueous liquid in which the target component is dispersed, said polymer saturating and filling pores and channels in said support means in a manner alternative to chemical bonding so as to form a multiplicity of microtendrils which anchor said skin to said porous support means.

15. The pervaporation membrane of claim 14 said membrane having two spaced-apart coextensive skins or layers of an organophilic polymer interconnected by microtendrils of the polymer; said porous support means is an open-cell microporous support; and microtendrils extending through said channels in combination with said support means provide strength and support for said polymer which is effectively thicker than the thickness of either of said coextensive skins on each side of the support.

16. The pervaporation membrane of claim 14 wherein said support has pores and channels therein having a diameter larger than the effective cross-section and the length of a molecule of said organophilic polymer.

17. The pervaporation membrane of claim 16 wherein said porous support has a total surface area to total pore cross-sectional area in the range from about 20:1 to about 2:1.

18. The pervaporation membrane of claim 17 wherein said porous support is a hollow fiber of a microporous organic polymer selected from the group consisting of polysulfone, polyolefins, polytetrafluoroethylene, polyvinylidene fluoride, polycarbonate, polyimide, cellulosic polymer, and polyamide; and, said organophilic polymer is selected from the group consisting of poly(siloxanes) crosslinked to provide silicone rubber; poly(isoprene); copolymer of $\alpha$-methylstyrene and poly(siloxane); polystyrene having a degree of polymerization of about 2 to 20; an aliphatic hydrocarbyl-containing organic compound having about 14 to 30 carbon atoms; polysilazanes; polyurethanes; poly(epichlorohydrin); polyamines; polyimines; and polyamides.

19. The pervaporation membrane of claim 18 wherein said porous support is selected from polyolefin and polysulfone, and said organophilic polymer is a crosslinked poly(siloxane) which forms a silicone rubber having a molecular weight in the range from 10000 to about 300000.

20. A process for separating a target component from a feed in which it is mixed, in a separation zone having a feed side and a permeate side, said process comprising, (a) contacting said feed side of a non-porous pervaporation membrane with said feed, wherein said pervaporation membrane comprises (i) a porous support means at least 20 $\mu m$ thick, having a multiplicity of pores and channels therewithin placing interior and exterior surfaces of said support means in open fluid communication, and, (ii) a solid, non-removable organophilic polymer substantially completely filling said pores and channels and affixed within said pores in a manner alternative to chemical bonding so that the thickness of said polymer is at least the distance between the interior and exterior surfaces of the porous support, and exhibits a selectivity greater than 10 which results in concentrating said target component, and, (b) withdrawing from the permeate side of the pervaporation membrane, a permeate wherein the proportion of the target component is enriched by at least an order of magnitude relative to its concentration in the feed.

21. The process of claim 20 wherein said porous support has interior and exterior surfaces, and is selected from the group consisting of a microporous organic polymer, ceramic, glass, carbon and sintered metal, wherein said pores extend from said interior surface to said exterior surface.

22. The process of claim 20 wherein said porous support is an organic polymer selected from polysulfone, polypropylene, polycarbonate, polyimide, cellulosic polymer, and polyamide; and, said organophilic polymer is selected from the group consisting of poly(siloxanes) crosslinked to provide silicone rubber; poly(isoprene); copolymer of α-methylstyrene and poly(siloxane); and, polystyrene having a degree of polymerization of about 2 to 20.

23. A process for separating at least one target component from an aqueous feedstream in which it is mixed and providing a permeate product, said process comprising, (a) contacting said feed with an exterior surface of a non-porous pervaporation membrane which exhibits selective permeation of said target component over that of water which results in concentrating said target component in said permeate product, and which comprises a relatively thick porous support means at least 20 μm thick, having a multiplicity of pores and channels therewithin placing interior and exterior surfaces of said support means in open fluid communication, and, a solid, non-removable organophilic polymer which exhibits selective permeation for said at least one target component, said polymer substantially completely filling said pores and channels, and affixed within said pores in a manner alternative to chemical bonding, provided the material of said porous support means and of said polymer are different, (b) maintaining the interior (permeate side) of said membrane at a lower chemical potential for said target component than the chemical potential of said exterior surface, (c) permeating said target component into and through the organophilic polymer, and, (d) withdrawing from the permeate side of the pervaporation membrane, said permeate product wherein the proportion of said target component is enriched by at least an order of magnitude relative to its concentration in said feedstream.

24. The process of claim 23 wherein said pressure over said interior surface is maintained in the range from about 0.1 mm to 1 mm of Hg, and said over said exterior surface is maintained at substantially atmospheric pressure.

25. The process of claim 24 wherein said target component is a halocarbon.

26. A method for making a pervaporation module, comprising, (a) constructing a module with a microporous support means fluid-tightedly disposed within a shell to provide separate feed and permeate sides, (b) introducing a solution of an organophilic polymer into the module on one of said sides, (c) increasing the pressure exerted upon the solution of said organophilic polymer until it fills pores and channels in said support means and exudes onto the other of said sides, (d) removing enough of said polymer remaining on said one of said sides to leave thereon a skin of curable polymer having a thickness in the range from 0–50 μm, and, (e) curing said polymer in said channels so as to be affixed within said pores in a manner alternative to chemical bonding, to provide an effective thickness of said polymer at least as great as the thickness of said support means.

27. The process of claim 26 wherein said support means comprises hollow fibers having interior and exterior surfaces, said organophilic polymer is introduced into the lumens of said hollow fibers, said pressure is less than 790 Kpa (100 psig), and exerted until said polymer flows outwardly to said exterior surface.

28. The process of claim 27 comprising removing said polymer with an inert sweep gas.

29. A module for use in a membrane device, comprising, a shell having two ends;

a pair of end closures with fluid couplings affixed to each of said ends of said shell;

a stack of assemblies of non-porous pervaporation membranes disposed within said shell, said membranes non-displaceably held at their terminal portions in a synthetic resinous mass, open ends of said membranes opening on a face of said mass, the remaining portions of said membranes being through-impregnated with an organophilic polymer which is affixed within said pores in a manner alternative to chemical bonding, and exposed to a through-passage within the shell;

said terminal portions in said synthetic resinous mass being free of said organophilic polymer;

an entrance passage in said shell communicating with said through-passage;

an exit passage in said shell communicating with said through-passage;

sealing means between said through-passage and said entrance passage, and between said through-passage and said exit passage;

means for feeding a feedstream to said shell so that it flows over said membranes under a sufficient driving force to effect the separation desired and yield a permeate, and, separately, a concentrate;

means to remove said permeate from said permeate zone; and, means to remove said concentrate from said concentrate zone.

* * * * *